United States Patent
Jang

(10) Patent No.: US 9,416,739 B2
(45) Date of Patent: Aug. 16, 2016

(54) APPARATUS AND METHOD FOR LEARNING AN AIR CONTROL VALVE OPENING OF A HYBRID ELECTRIC VEHICLE

(71) Applicant: HYUNDAI MOTOR COMPANY, Seoul (KR)

(72) Inventor: HwaYong Jang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/864,848

(22) Filed: Sep. 24, 2015

(65) Prior Publication Data

US 2016/0108830 A1    Apr. 21, 2016

(30) Foreign Application Priority Data

Oct. 20, 2014  (KR) .................... 10-2014-0142068

(51) Int. Cl.
| | |
|---|---|
| *B60T 17/02* | (2006.01) |
| *F02D 41/00* | (2006.01) |
| *F02D 41/06* | (2006.01) |
| *F02D 41/26* | (2006.01) |
| *B60W 20/00* | (2016.01) |
| *B60W 50/00* | (2006.01) |

(52) U.S. Cl.
CPC ........... *F02D 41/0002* (2013.01); *B60W 20/00* (2013.01); *B60W 50/00* (2013.01); *F02D 41/062* (2013.01); *F02D 41/263* (2013.01); *B60W 2050/0014* (2013.01); *B60W 2050/0089* (2013.01); *B60W 2710/0616* (2013.01); *Y10S 903/905* (2013.01)

(58) Field of Classification Search
CPC ..... F02D 41/0002; B60W 20/00; B60T 17/02
See application file for complete search history.

(56) References Cited

U.S. PATENT DOCUMENTS

| | | | | |
|---|---|---|---|---|
| 8,682,546 B2* | 3/2014 | Otsuka | ................. | F02D 11/105 123/192.1 |
| 8,714,119 B2* | 5/2014 | Pett, Jr. | .................... | F02B 19/00 123/53.6 |
| 2014/0167944 A1* | 6/2014 | Yamaguchi | ............ | B60K 37/02 340/439 |
| 2015/0343893 A1* | 12/2015 | Nam | .................... | B60K 11/085 701/49 |

FOREIGN PATENT DOCUMENTS

| | | |
|---|---|---|
| JP | 3846109 B2 | 11/2006 |
| JP | 2010-065529 A | 3/2010 |
| JP | 2013-154699 A | 8/2013 |
| KR | 10-2003-0089247 A | 11/2003 |
| KR | 10-2005-0060916 A | 6/2005 |
| KR | 10-2014-0073983 A | 6/2014 |

\* cited by examiner

*Primary Examiner* — Thomas Tarcza
*Assistant Examiner* — Alex C Dunn
(74) *Attorney, Agent, or Firm* — McDermott Will & Emery LLP

(57) ABSTRACT

A method for learning an opening of an air control valve of a hybrid electric vehicle includes detecting data for controlling the opening of the air control valve during engine starting, detecting a change of a flap closing of the air control valve, controlling the opening of the air control valve to reduce a vibration based on the data when the engine is turned off, calculating the opening of the air control valve according to the flap closing of the air control valve, setting a reference value based on the change of the flap closing of the air control valve, comparing the calculated value with the reference value and when the calculated value is greater than the reference value, learning the opening of the air control valve as the calculated value after an ignition switch is turned off.

13 Claims, 3 Drawing Sheets

APPARATUS AND METHOD FOR LEARNING AN AIR CONTROL VALVE OPENING OF A HYBRID ELECTRIC VEHICLE

CROSS-REFERENCE TO RELATED APPLICATION

This application claims the benefit of priority to Korean Patent Application No. 10-2014-0142068, filed in the Korean Intellectual Property Office on Oct. 20, 2014, the entire contents of which are incorporated herein by reference.

TECHNICAL FIELD

The present disclosure relates to an apparatus and a method for learning an opening of an air control valve of a hybrid electric vehicle. More particularly, the present disclosure relates to an apparatus and a method for learning an opening of an air control valve of a hybrid electric vehicle that monitors an inlet of the air control valve and learns an opening of the air control valve in a hybrid electric vehicle using a diesel engine.

BACKGROUND

A hybrid vehicle is a vehicle using two or more different kinds of power sources, and is generally a vehicle that is driven by an engine that obtains a driving torque by burning fuel and a motor that obtains a driving torque with battery power.

The hybrid electric vehicle is provided with a gasoline engine or a diesel engine. In the diesel engine hybrid electric vehicle, an exhaust gas recirculation system to reduce exhaust gasses and a turbocharger to improve power performance may be mounted on the diesel engine. Particularly, an air control valve (ACV) to reduce vibrations of the vehicle should be provided at the diesel engine.

In the diesel hybrid electric vehicle, vibrations of the engine are generated by combusting fuel injected into the diesel engine after an ignition key is turned off. In order to prevent such vibrations of the engine, the diesel hybrid electric vehicle controls an opening of the air control valve and blocks intake air to prevent combustion.

In addition, the opening of the air control valve is adjusted to maintain an appropriate temperature when a diesel particulate filter (DPF) which reduces exhaust gas is operated.

However, exhaust gas sucked into a manifold may cause soot which includes particles due to incomplete combustion, and the soot may accumulate at the air control valve. In this case, an inlet of the air control valve may narrow according to the accumulated soot.

In the conventional art, an amount of air inflow is adjusted without learning the opening of the air control valve because the air control valve is a new product. However, if the inlet of the air control valve narrows as described above, the air control valve may not be operated precisely and emissions regulations may not be satisfied.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to provide an apparatus and a method for learning an opening of an air control valve of a hybrid electric vehicle having advantages of monitoring an inlet of the air control valve and learning an opening of the air control valve in the hybrid electric vehicle.

An exemplary embodiment of the present disclosure provides a method for learning an opening of an air control valve of a hybrid electric vehicle that may include: detecting data for controlling the opening of the air control valve during engine starting; detecting a change of a flap closing the air control valve; controlling the opening of the air control valve to reduce a vibration based on the data when the engine is turned off; calculating the opening of the air control valve according to the flap closing of the air control valve; setting a reference value based on the change of the flap closing of the air control valve; comparing the calculated value with the reference value; and when the calculated value is greater than the reference value, learning the opening of the air control valve as the calculated value after an ignition switch is turned off.

The engine of the hybrid electric vehicle may be a diesel engine.

The method may further include, when the calculated value is smaller than or equal to the reference value, not learning the opening of the air control valve.

The data may include information on at least one of a position value of an accelerator pedal, an engine speed, and a temperature of an engine oil.

The reference value based on the change of the flap closing of the air control valve may be set by feedback on initial flap closing of the air control valve.

Another exemplary embodiment of the present disclosure provides an apparatus for learning an opening of an air control valve of a hybrid electric vehicle that may include: an engine provided with an air control valve; a data detector configured to detect data for controlling the opening of the air control valve; and a controller configured to detect a change of a flap closing the air control valve during the engine starting, calculate the opening of the air control valve according to the flap closing of the air control valve when the engine is turned off, and learn the opening of the air control valve by comparing the calculated value and a reference value after an ignition switch is turned off.

The engine of the hybrid electric vehicle may be a diesel engine.

The data detector may include: an accelerator pedal position sensor configured to detect a position value of an accelerator pedal; an engine speed sensor configured to detect a speed of the engine; and an oil temperature sensor configured to detect a temperature of an engine oil.

The controller may control the opening of the air control valve to reduce a vibration based on the data when the engine is turned off.

The controller may set the reference value based on the change of the flap closing of the air control valve.

The controller may learn the opening of the air control valve as the calculated value after the ignition switch is turned off when the calculated value is greater than the reference value.

The controller may set the reference value by feedback on initial flap closing of the air control valve.

Yet another exemplary embodiment of the present disclosure provides a method for learning an opening of an air control valve of a diesel engine hybrid electric vehicle that may include: detecting flap closing of the air control valve during the diesel engine starting; calculating the opening of the air control valve according to the flap closing of the air control valve when the diesel engine is turned off; setting a reference value by comparing the flap closing of the air control valve with an initial flap closing of the air control valve; and when the calculated value is greater than the reference value, learning the opening of the air control valve as the calculated value after an ignition switch is turned off.

As described above, according to an exemplary embodiment of the present disclosure, an optimal engine combustion condition can be maintained and emission regulations may be satisfied by learning the opening of the air control valve of the hybrid electric vehicle even though soot accumulates at the air control valve.

DETAILED DESCRIPTION

Figure 1:
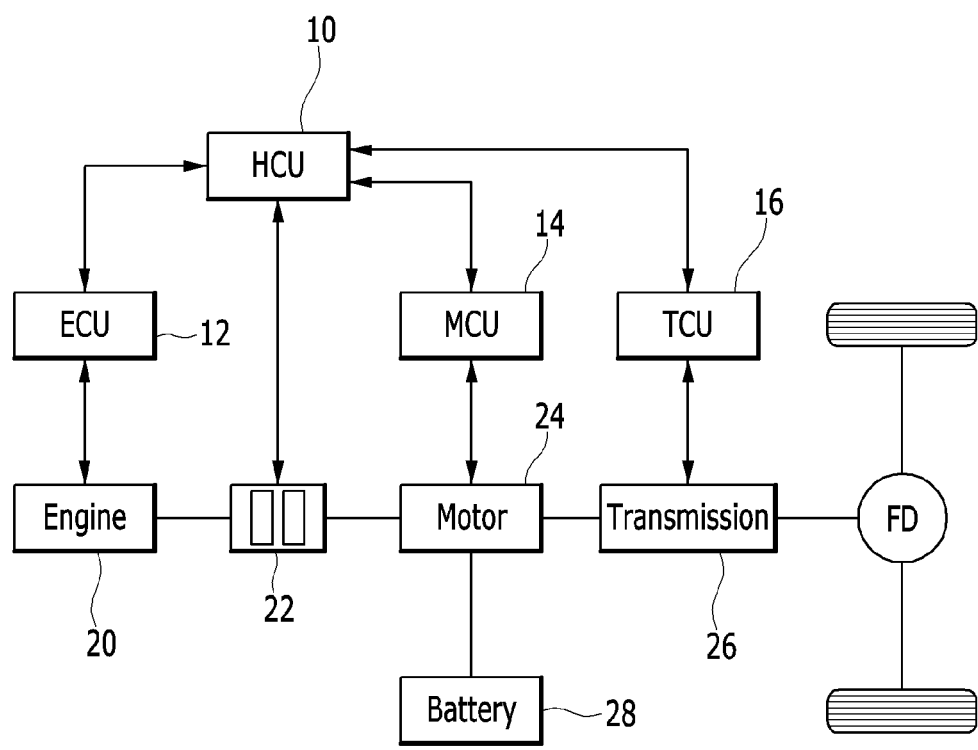
FIG. 1 is a schematic diagram of a hybrid system to which a method for learning an opening of an air control valve of a hybrid electric vehicle is applied according to an exemplary embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle", "vehicular", or other similar terms as used herein is inclusive of motor vehicles in general, including hybrid vehicles, plug-in hybrid electric vehicles, and other alternative fuel vehicles (e.g., using fuels derived from resources other than petroleum). As referred to herein, a hybrid electric vehicle is a vehicle that has two or more sources of power, for example a vehicle that is both gasoline powered and electricity powered.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present disclosure will hereinafter be described in detail with reference to the accompanying drawings.

FIG. 1 is a schematic diagram of a hybrid system to which a method for learning an opening of an air control valve of a hybrid electric vehicle is applied according to an exemplary embodiment of the present disclosure.

The hybrid system as shown in FIG. 1 is an exemplary embodiment of the present disclosure for better comprehension and ease of description. A method for learning an opening of an air control valve of a hybrid electric vehicle according to an exemplary embodiment of the present disclosure may not only be applied to the hybrid system as shown in FIG. 1, but also to all other hybrid systems.

As shown in FIG. 1, the hybrid system, to which a method for learning an opening of an air control valve of a hybrid electric vehicle is applied according to an exemplary embodiment of the present disclosure, may include a hybrid control unit (HCU) 10, an electronic control unit (ECU) 12, a motor control unit (MCU) 14, a transmission control unit (TCU) 16, an engine 20, an engine clutch 22, a motor 24, a transmission 26 and a battery 28.

The HCU 10 controls the operation of other controllers which mutually exchange information in an operation of a hybrid electric vehicle. Accordingly, the HCU 10 controls output torque of the engine 20 and the motor 24 by cooperating with the other controllers.

The ECU 12 controls an operation of the engine 20 according to conditions of the engine 20, such as a demand torque from a driver, a coolant temperature and an engine torque.

The MCU 14 controls an operation of the motor 24 according to a demand torque of a driver, a driving mode of the hybrid electric vehicle and a SOC condition of the battery 28.

The TCU 16 controls operations of the transmission 26, such as speed ratios of the transmission 26 depending on output torque of the engine 20 and the motor 24, and an amount of regenerative braking.

The engine 20 outputs power as a power source while operating.

The engine clutch 22 is disposed between the engine 20 and the motor 24 and receives a control signal of the HCU 10, and selectively connects the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing the engine clutch 22 as an input torque, and selects a shift gear according to a vehicle speed and a driving condition to output driving force to a driving wheel.

The battery 28 is composed of a plurality of unit cells, and stores a high voltage for supplying a voltage to the motor 24. The voltage can be, for example, 400 V to 450 V DC.

Figure 2:
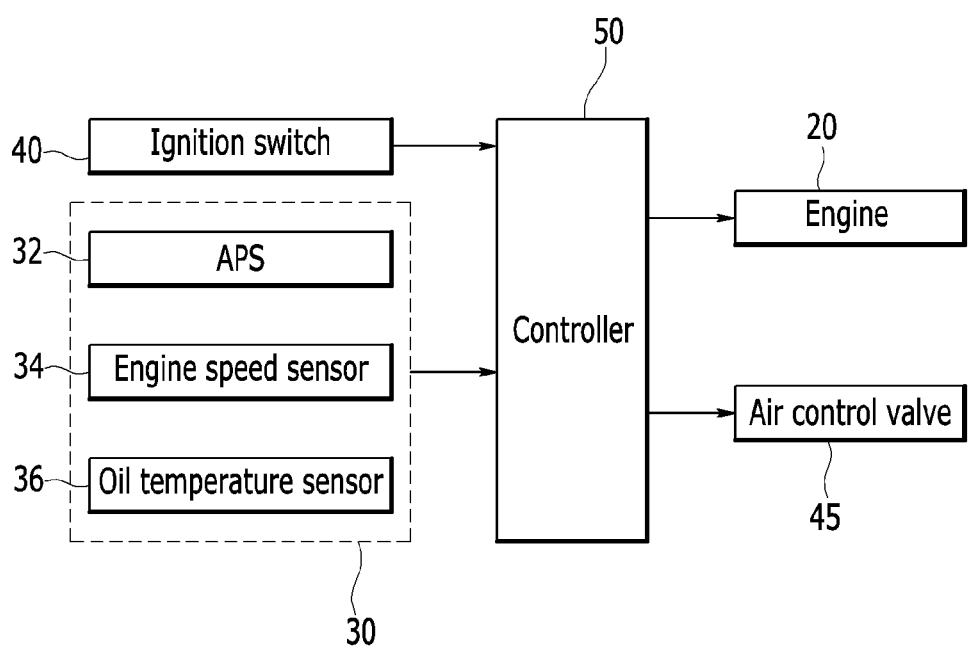
FIG. 2 is a schematic block diagram of an apparatus for learning an opening of an air control valve of a hybrid electric vehicle according to an exemplary embodiment of the present disclosure.

FIG. 2 is a schematic block diagram of an apparatus for learning an opening of an air control valve of a hybrid electric vehicle according to an exemplary embodiment of the present disclosure.

The hybrid electric vehicle, to which an exemplary embodiment of the present disclosure is applied, includes at least one engine 20 and at least one motor 24. In addition, the hybrid electric vehicle provides a driving mode in which the engine 20 and the motor 24 separately or simultaneously operate as a power source.

The apparatus for learning an opening of an air control valve of a hybrid electric vehicle according to an exemplary embodiment of the present disclosure may include a data detector 30, an ignition switch 40, the engine 20, an air control valve 45 and a controller 50.

In the exemplary embodiment of the present disclosure, the engine 20 may be a diesel engine provided with the air control valve 45.

Some processes in the method for learning an opening of an air control valve of the hybrid electric vehicle according to an exemplary embodiment of the present disclosure to be described below may be performed by the ECU 12, and some processes may be performed by the HCU 10. Accordingly, for convenience of description, in this specification and claims, many controllers provided in the hybrid electric vehicle such as the ECU 12 and the HCU 10 are called the controller 50.

The data detector 30 may include an accelerator pedal position sensor (APS) 32, an engine speed sensor 34 and an oil temperature sensor 36.

The accelerator pedal position sensor 34 may continuously detect a position value of an accelerator pedal and transmit a monitoring signal to the controller 50. The position value of the accelerator pedal may be 100% when the accelerator pedal is pressed fully, and the position value of the accelerator pedal may be 0% when the accelerator pedal is not pressed.

The engine speed sensor 34 may detect a rotation speed of the engine from a change in phase of a crankshaft, and transmit a corresponding signal to the controller 50.

The oil temperature sensor 36 may detect a temperature of engine oil and transmit a corresponding signal to the controller 50.

The ignition switch 40 may transmit a signal of selecting information on ignition key on or off to the controller 50.

The air control valve 45 may be mounted at a predetermined position in an intake manifold of the engine 20, and an opening of the air control valve 45 may be adjusted by the controller 50 to control an amount of air inflow.

The air control valve 45 may be provided with a flap, so the amount of air inflow may be adjusted according to a flap closing. If soot which includes particles due to incomplete combustion is accumulated at the air control valve 25, the closing amount of the flap may be changed.

The controller 50 may detect a change of a flap closing of the air control valve 45 during the engine starting, and calculate the opening of the air control valve 45 according to the flap closing of the air control valve 45 when the engine is turned off.

The controller 50 may selectively learn the opening of the air control valve 45 according to the calculated value and the flap closing of the air control valve 45 when the ignition switch 40 is turned off.

Accordingly, the controller 50 may learn the opening of the air control valve 45 when the calculated value is greater than a predetermined reference value.

In addition, the controller 50 may control the opening of the air control valve 45 to reduce vibrations of the hybrid electric vehicle whenever the engine is turned off.

To this end, the controller 50 may be implemented as at least one processor operated by a predetermined program, and the predetermined program may be programmed in order to perform each step of a method for learning an opening of an air control valve of the hybrid electric vehicle according to an exemplary embodiment of the present disclosure.

Hereinafter, a method for learning an opening of an air control valve of the hybrid electric vehicle according to an exemplary embodiment of the present disclosure will be described in detail with reference to FIG. 3.

Figure 3:
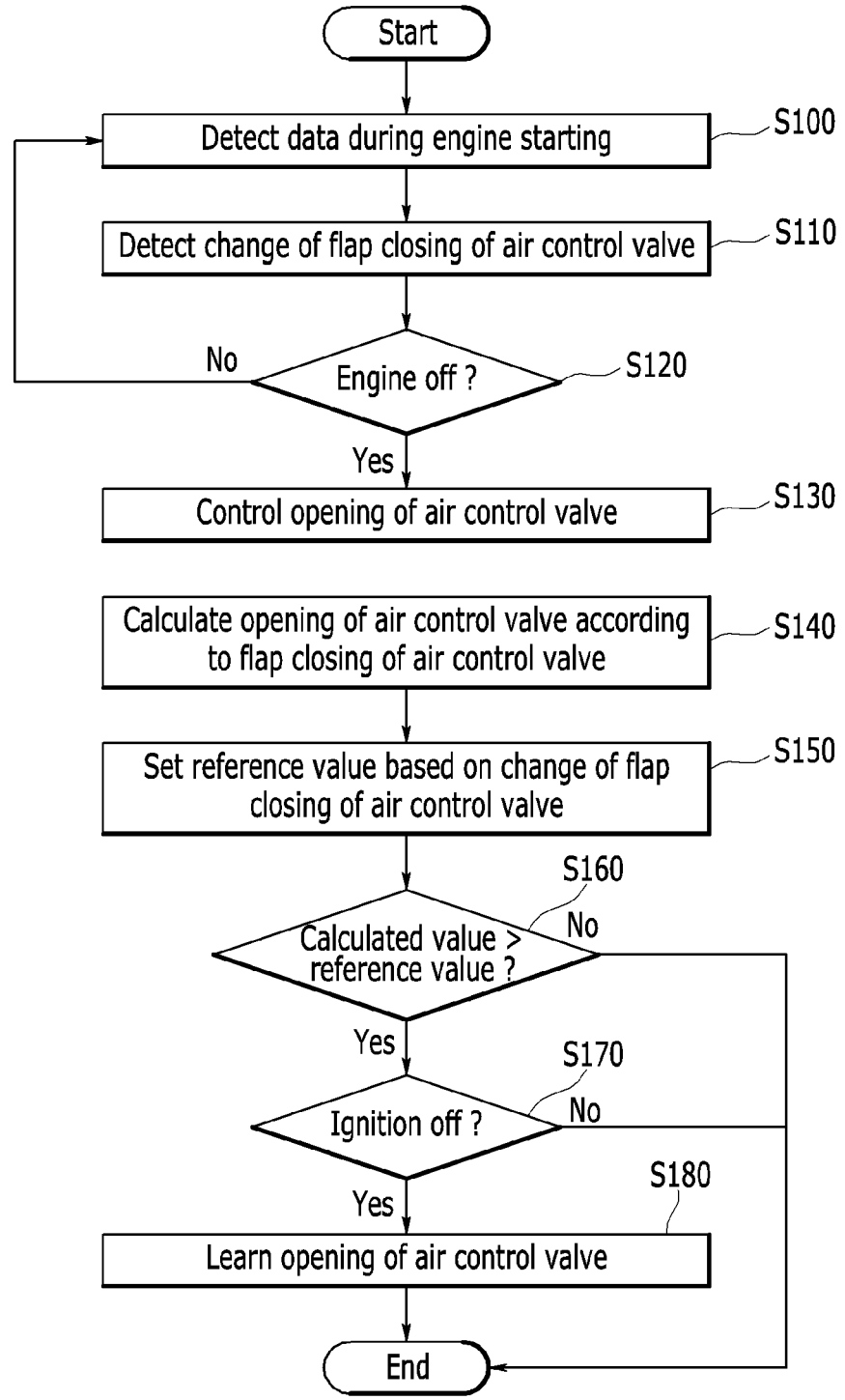
FIG. 3 is a flowchart showing a method for learning an opening of an air control valve of a hybrid electric vehicle according to an exemplary embodiment of the present disclosure.

FIG. 3 is a flowchart showing a method for learning an opening of an air control valve of a hybrid electric vehicle according to an exemplary embodiment of the present disclosure.

As shown in FIG. 3, a method for learning an opening of an air control valve of a hybrid electric vehicle according to an exemplary embodiment of the present disclosure may begin with detecting data by the data detector 30 during the engine starting at step S100.

The controller 50 detects a change of flap closing of the air control valve 45 during the engine starting at step S110.

As described above, the flap closing of the air control valve 45 may be changed by an amount of soot accumulated at the air control valve 45. Therefore, the controller 50 detects the change of the flap closing of the air control valve 45 compared to an initial flap closing of the air control valve 45.

After that, the controller 50 determines whether the engine 20 is turned off based on the data detected at the step S100 at step S120.

In the present specification and claims, a case in which the engine 20 is turned off includes both a case in which a driving mode of the hybrid electric vehicle is converted from the HEV mode to the EV mode, and a case in which the hybrid electric vehicle is coasting without an operation of the engine 20.

When the engine 20 is turned off at the step S120, the controller 50 controls the opening of the air control valve 45 to reduce vibrations of the hybrid electric vehicle at step S130.

The controller 50 may control the opening of the air control valve 45 and adjust an amount of air sucked into a combustion chamber of the engine 20, such that vibrations and noise of the hybrid electric vehicle may be reduced.

In addition, the controller 50 calculates the opening of the air control valve 45 according to the flap closing of the air control valve 45 at step S140. The calculated value of the opening of the air control valve 45 may be temporarily stored in a memory.

The controller 50 sets a reference value based on the change of the flap closing of the air control valve 45 detected at the step S110 at step S150. The reference value based on the change of the flap closing of the air control valve 45 is set by feedback on initial flap closing of the air control valve 45.

When the reference value is set at the step S150, the controller 50 compares the calculated value at the step S140 with the reference value at the step S150 at step S160.

When the calculated value is smaller than or equal to the reference value at the step S160, the controller 50 finishes a method for learning an opening of an air control valve of a hybrid electric vehicle according to an exemplary embodiment of the present disclosure.

On the other hand, when the calculated value is greater than the reference value at the step S160, the controller 50 determines whether the ignition switch 40 is turned off at step S170.

When the ignition switch 40 is turned off at the step S170, the controller 50 learns the opening of the air control valve 45 as the calculated value at step S180.

That is, the controller 50 may learn the opening of the air control valve 45 only in a case that the flap closing of the air control valve 45 is changed by soot accumulated at the air control valve 45 and the opening of the air control valve 45 is changed more than the reference value according to the flap closing of the air control valve 45.

As described above, according to an exemplary embodiment of the present disclosure, an optimal engine combustion condition can be maintained and emission regulations may be satisfied by learning the opening of the air control valve of the hybrid electric vehicle even though soot accumulates at the air control valve.

While this disclosure has been described in connection with what is presently considered to be practical exemplary embodiments, it is to be understood that the disclosure is not limited to the disclosed embodiments. On the contrary, it is intended to flap various modifications and equivalent arrangements included within the spirit and scope of the appended claims.

What is claimed is:

1. A computer implemented method for learning an opening of an air control valve of a hybrid electric vehicle, comprising:
    detecting data for controlling the opening of the air control valve during engine starting;
    detecting a change of a flap closing of the air control valve;
    controlling the opening of the air control valve to reduce a vibration based on the data when the engine is turned off;
    calculating the opening of the air control valve according to the flap closing of the air control valve;
    setting a reference value based on the change of the flap closing of the air control valve;
    comparing the calculated value with the reference value; and
    when the calculated value is greater than the reference value, learning the opening of the air control valve as the calculated value after an ignition switch is turned off.

2. The method of claim 1, wherein the engine of the hybrid electric vehicle is a diesel engine.

3. The method of claim 1, further comprising,
    when the calculated value is smaller than or equal to the reference value, not learning the opening of the air control valve.

4. The method of claim 1, wherein the data includes information on at least one of a position value of an accelerator pedal, an engine speed and a temperature of an engine oil.

5. The method of claim 1, wherein the reference value based on the change of the flap closing of the air control valve is set by feedback from an initial flap closing of the air control valve.

6. An apparatus for learning an opening of an air control valve of a hybrid electric vehicle, comprising:
    an engine provided with an air control valve;
    a data detector configured to detect data for controlling the opening of the air control valve; and
    a controller configured to detect a change of a flap closing of the air control valve during engine starting, calculate the opening of the air control valve according to the flap closing of the air control valve when the engine is turned off, and learn the opening of the air control valve by comparing the calculated value and a reference value after an ignition switch is turned off.

7. The apparatus of claim 6, wherein the engine of the hybrid electric vehicle is a diesel engine.

8. The apparatus of claim 6, wherein the data detector comprises:
    an accelerator pedal position sensor configured to detect a position value of an accelerator pedal;
    an engine speed sensor configured to detect a speed of the engine; and
    an oil temperature sensor configured to detect a temperature of an engine oil.

9. The apparatus of claim 6, wherein the controller controls the opening of the air control valve to reduce a vibration based on the data when the engine is turned off.

10. The apparatus of claim 6, wherein the controller sets the reference value based on the change of the flap closing of the air control valve.

11. The apparatus of claim 10, wherein the controller learns the opening of the air control valve as the calculated value after the ignition switch is turned off when the calculated value is greater than the reference value.

12. The apparatus of claim 10, wherein the controller sets the reference value by feedback from an initial flap closing of the air control valve.

13. A computer implemented method for learning an opening of an air control valve of a diesel engine hybrid electric vehicle, comprising:
    detecting a flap closing of the air control valve during a diesel engine starting;
    calculating the opening of the air control valve according to the flap closing of the air control valve when the diesel engine is turned off;
    setting a reference value by comparing the flap closing of the air control valve with an initial flap closing of the air control valve; and
    when the calculated value is greater than the reference value, learning the opening of the air control valve as the calculated value after an ignition switch is turned off.

* * * * *